US008867676B2

(12) United States Patent
Cairns

(10) Patent No.: US 8,867,676 B2
(45) Date of Patent: Oct. 21, 2014

(54) METHOD AND APPARATUS FOR CONTROLLING INTERFERENCE SUPPRESSING RECEIVERS

(75) Inventor: Douglas A. Cairns, Durham, NC (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 3249 days.

(21) Appl. No.: 10/943,720

(22) Filed: Sep. 17, 2004

(65) Prior Publication Data

US 2006/0063505 A1 Mar. 23, 2006

(51) Int. Cl.
*H03D 1/04* (2006.01)
*H04L 25/03* (2006.01)
*H04B 1/7097* (2011.01)

(52) U.S. Cl.
CPC .................. *H04L 25/03006* (2013.01); *H04B 2201/709727* (2013.01); *H04B 1/7097* (2013.01); *H04L 2025/03535* (2013.01)
USPC ........................................................ 375/346

(58) Field of Classification Search
USPC ......... 375/130, 140, 141, 144, 145, 147, 148, 375/149, 316, 340, 346; 370/203, 208, 210, 370/343, 344, 335, 331, 310, 328, 329, 342, 370/441; 455/302, 296, 303, 307, 436, 442, 455/422.1, 403
See application file for complete search history.

(56) References Cited

U.S. PATENT DOCUMENTS 5,822,360 A * 10/1998 Lee et al. ....................... 375/140
6,122,309 A 9/2000 Bergstrom et al.
6,324,210 B1 11/2001 Yang et al.
6,473,450 B1 10/2002 Sutterlin et al.
6,618,434 B2 9/2003 Heidari-Bateni et al.
(Continued)

FOREIGN PATENT DOCUMENTS

WO WO 01/01594 * 1/2001 ............. H04B 1/707
WO WO 02/078205 10/2002
(Continued)

OTHER PUBLICATIONS

US 2004/0032848; Papasakellariou; Combined Equalizer and Spread Spectrum Interference Canceller Method and Implementation for the Downlink of CDMA Systems; Feb. 19, 2004.
(Continued)

*Primary Examiner* — Vineeta Panwalkar
(74) *Attorney, Agent, or Firm* — Coats and Bennett, PLLC

(57) ABSTRACT

A wireless communication receiver is configured to suppress interference with respect to a received signal of interest on a selective basis responsive to evaluating whether the receiver currently is or is not operating in a colored noise/interference environment. For example, an exemplary Code Division Multiple Access (CDMA) mobile station activates or deactivates interference suppression responsive to determining and evaluating an orthogonality factor, which, in this context, serves as a measure of how much downlink power gets converted into same-cell interference via multipath propagation. The orthogonality factor thus serves as an indicator of noise plus interference coloration. In one or more exemplary embodiments, then, an exemplary receiver circuit is configured to determine the orthogonality factor, evaluate it, and selectively enable or disable received signal whitening based on that evaluation. The exemplary receiver circuit and associated selective whitening method can be applied to various receiver architectures and signal types.

27 Claims, 4 Drawing Sheets

(56) References Cited

U.S. PATENT DOCUMENTS

| | | |
|---|---|---|
| 6,683,924 B1 | 1/2004 | Ottosson et al. |
| 6,801,565 B1* | 10/2004 | Bottomley et al. ............ 375/148 |
| 6,944,434 B2* | 9/2005 | Mattellini et al. ............ 455/296 |
| 2002/0126778 A1 | 9/2002 | Ojard et al. |
| 2002/0137485 A1* | 9/2002 | Nilsson et al. ............. 455/184.1 |
| 2003/0031236 A1* | 2/2003 | Dahlman et al. .............. 375/147 |
| 2003/0053522 A1* | 3/2003 | Hayoun et al. ................ 375/147 |
| 2003/0232612 A1* | 12/2003 | Richards et al. ............. 455/323 |
| 2004/0022335 A1 | 2/2004 | Arslan et al. |
| 2004/0028013 A1* | 2/2004 | Fitton et al. .................... 370/335 |
| 2004/0043800 A1* | 3/2004 | Hosoi ........................ 455/575.1 |
| 2004/0264417 A1* | 12/2004 | Heikkila et al. ............. 370/335 |
| 2005/0026578 A1* | 2/2005 | Kelley ........................... 455/132 |
| 2005/0250466 A1* | 11/2005 | Varma et al. .................. 455/296 |

FOREIGN PATENT DOCUMENTS

| | | |
|---|---|---|
| WO | WO 03/036810 | 5/2003 |
| WO | WO 03/069790 | 8/2003 |
| WO | WO 2005/002241 | 1/2005 |

OTHER PUBLICATIONS

US 2003/0007548; Nagano; CDMA Receiver, CDMA Receiving Method and Program Thereof; Jan. 9, 2003.

US 2002/0159547; Lindoff et al.; Co-Channel Interference Canceller; Oct. 31, 2002.

US 2002/0154713; Sparrman et al.; Reduction of Linear Interference Canceling Scheme; Oct. 24, 2002.

US 2002/0122470; Heikkila; Method and Apparatus for Providing Blind Adaptive Estimation and Reception; Sep. 5, 2002.

Awoniyi, O., et al., "Characterizing the Orthogonality Factor in WCDMA Downlinks," *IEEE Transactions on Wireless Communications*, Jul. 4, 2003, vol. 2, No. 4, pp. 621-625.

Mehta, N.B., et al. "Analysis and Results for the Orthogonality Factor in WCDMA Downlinks," *IEEE Transactions on Wireless Communications*, Nov. 6, 2003, vol. 2, No. 6, pp. 1138-1149.

Pedersen, K.I. et al., "The Downlink Orthogonality Factors Influence on WCDMA System Performance," Nokia Networks; 5 pp.

Bottomley et al., "A Generalized RAKE Receiver for Interference Suppression," IEEE Journal on Selected Areas in Communications, Aug. 2000, pp. 1536-1545, vol. 18, No. 8.

\* cited by examiner

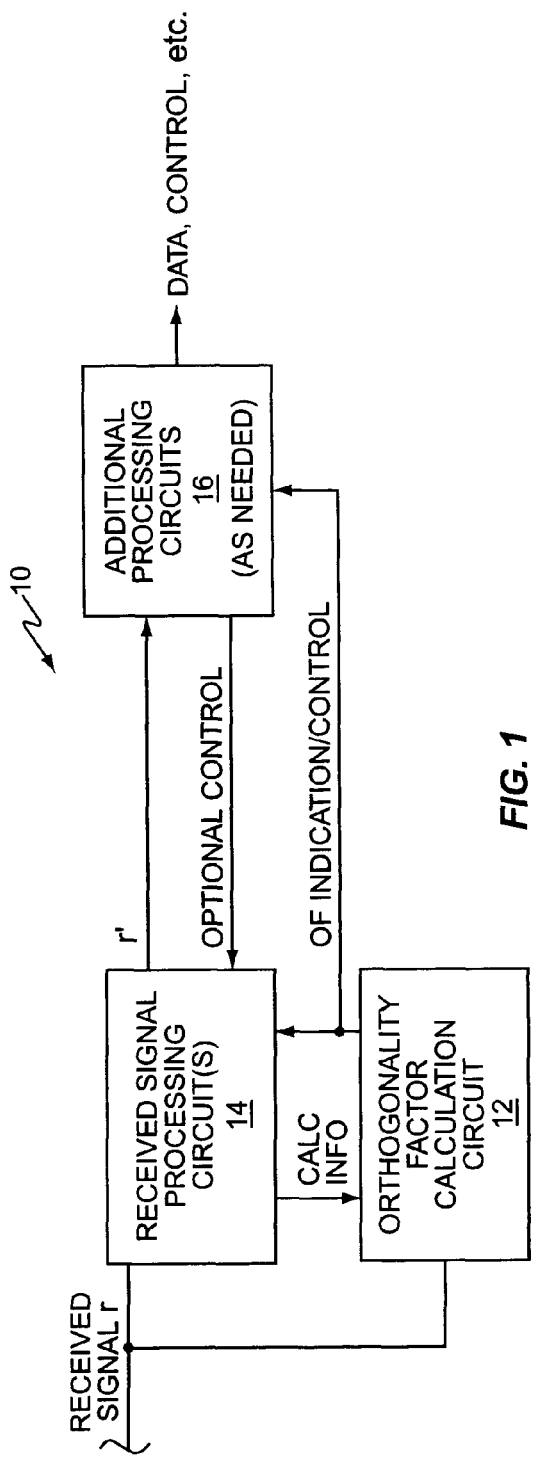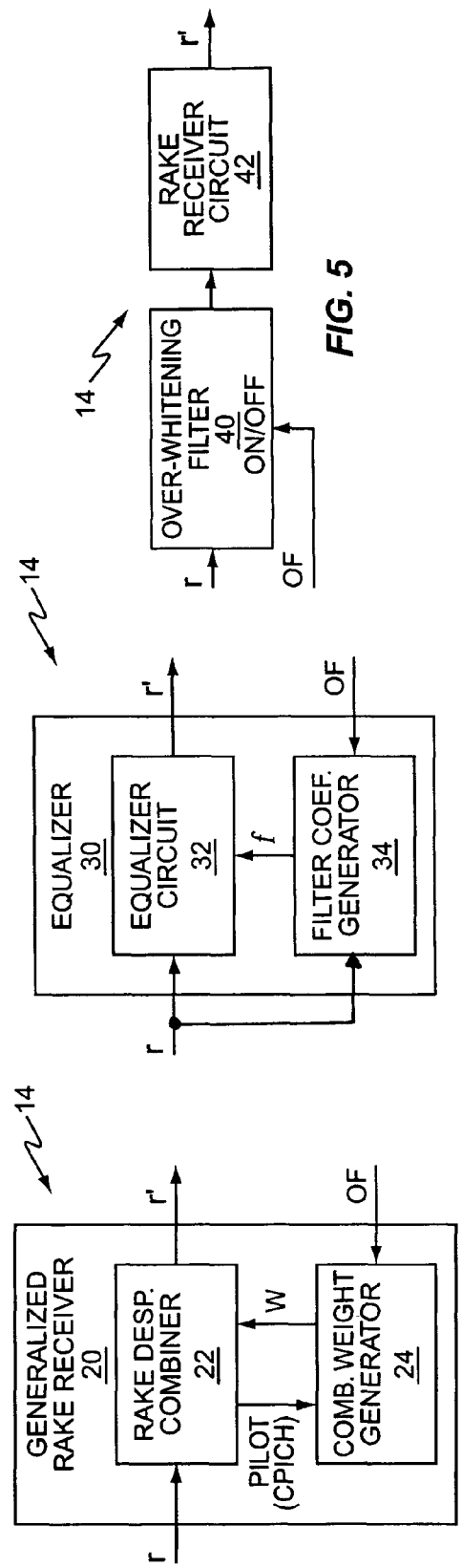

METHOD AND APPARATUS FOR CONTROLLING INTERFERENCE SUPPRESSING RECEIVERS

BACKGROUND OF THE INVENTION

The present invention generally relates to wireless communication systems, and particularly relates to controlling interference suppression in wireless communication receivers.

Interference suppression represents one of the more important mechanisms employed in wireless communication receivers to improve signal detection reliability. For example, Code Division Multiple Access (CDMA) wireless communication receivers often are configured with some form of interference suppression. Indeed, some of the more complex modulation formats being deployed in higher data rate wireless communication systems cannot be demodulated with acceptable error rates absent interference suppression at the receivers, at least under certain unfavorable channel conditions.

With interference suppression, a receiver attempts to characterize received signal noise and interference, such as by estimating one or more statistical properties. The receiver then uses those characterizations, which are dynamically updated to reflect changing reception conditions, to suppress at least a portion of that interference and noise. As an example, a receiver may be configured to suppress colored noise and interference by maintaining a dynamically updated matching filter that whitens the received signal, and thereby improves demodulation performance.

However, such processing may be marginally beneficial under at least some conditions. For example, when the received signal's interference plus noise spectrum is flat, e.g., white, interference suppression processing may not improve the receiver's performance. Further, the application of interference suppression during conditions when it is not needed represents needless expense in terms of operating power and computational overhead.

SUMMARY OF THE INVENTION

The present invention comprises a method and apparatus for controlling interference suppression in a wireless communication receiver. In an exemplary embodiment, selective interference suppression comprises selectively whitening a received signal responsive to evaluating whether such whitening is or is not appropriate for current received signal conditions. An exemplary determination involves an assessment of whether the received signal's noise plus interference spectrum is or is not colored. By selectively applying whitening processing responsive to changing received signal conditions, an exemplary receiver can improve its reception performance, save power, and/or reduce its computational overhead. Further, the selective application of such interference suppression can be made dependent on operational conditions, such as by disabling interference suppression when the receiver is in soft handover between radio transmitters.

Thus, the present invention includes a method of received signal processing in a wireless communication receiver based on calculating an orthogonality factor for the received signal, and selectively whitening the received signal based on the orthogonality factor. In one embodiment, selectively whitening the received signal based on the orthogonality factor comprises whitening the received signal if the orthogonality factor is above a defined orthogonality factor threshold, and not whitening the received signal if the orthogonality factor is below a defined orthogonality factor threshold.

A wireless communication receiver circuit may, according to the present invention, comprise an orthogonality factor calculation circuit configured to calculate an orthogonality factor for a received signal, and one or more received signal processing circuits configured selectively to whiten the received signal based on the orthogonality factor. In one embodiment, the one or more received signal processing circuits comprise a RAKE receiver. The RAKE receiver, which is configured as a Generalized RAKE receiver, generates whitening RAKE combining weights for RAKE combining the received signal if the orthogonality factor is above a defined orthogonality factor threshold, and generates non-whitening RAKE combining weights for RAKE combining the received signal if the orthogonality factor is below a defined orthogonality factor threshold.

In another embodiment, the one or more received signal processing circuits comprise a received signal equalizer. The equalizer is configured to generate whitening equalizer filter coefficients for equalizing the received signal if the orthogonality factor is above a defined orthogonality factor threshold, and configured to generate non-whitening equalizer filter coefficients for equalizing the received signal if the orthogonality factor is below a defined orthogonality factor threshold.

In another embodiment, the one or more received signal processing circuits comprise a RAKE receiver circuit and an over-whitening filter. The over-whitening filter functionally is positioned in advance of the RAKE receiver circuit, and wherein the filter is configured to over-whiten the received signal if the orthogonality factor is above a defined orthogonality factor threshold, and not to over-whiten the received signal if the orthogonality factor is below a defined orthogonality factor threshold.

Calculation of the orthogonality factor may be based on medium channel coefficients as calculated for the received signal. More particularly, the orthogonality factor can be computed dynamically, on an ongoing basis, as a time-averaged value based on the average power of the medium channel coefficients.

Of course, the present invention is not limited to the above features and advantages. Those skilled in the art will recognize additional features and advantages of the present invention upon reading the following detailed description and upon viewing the accompanying figures, in which like or similar elements are assigned like reference numbers.

BRIEF DESCRIPTION OF THE DRAWINGS

FIG. 1 is a diagram of an exemplary receiver according to one or more embodiments of the present invention.

FIG. 3 is a diagram of selective received signal whitening based on a Generalized RAKE receiver circuit.

FIG. 4 is a diagram of selective received signal whitening based on a received signal (chip-spaced) equalizer.

FIG. 5 is a diagram of selective received signal whitening based on a RAKE receiver and a selectively enabled over-whitening filter.

DETAILED DESCRIPTION OF THE INVENTION

Figure 7:
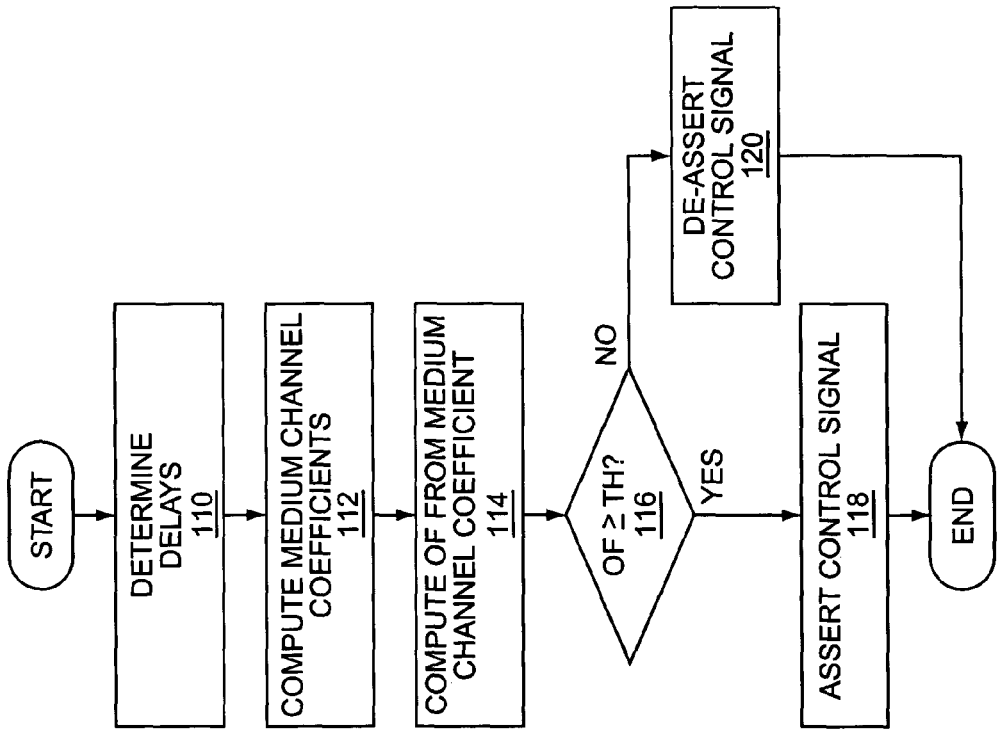
FIG. 7 is a diagram of exemplary processing logic for determining medium channel coefficients, and calculating an orthogonality factor therefrom.

Linear interference suppression in wireless communication systems can be viewed as the classic "matched filter in colored noise" problem. The optimal (SINR) solution to this problem is given by $$H(\omega) = \frac{P^*(\omega)G^*(\omega)}{I_{or}|P^*(\omega)G^*(\omega)|^2 + \Phi(\omega)}, \quad (1)$$

where $P(\omega)$ represents the frequency response of the transmit pulse shaping filter, $G(\omega)$ represents the frequency response of the medium propagation channel, $I_{or}$ represents total base station transmit power, and $\Phi(\omega)$ represents the power spectral density (PSD) of inter-cell interference plus noise. Typically there is a corresponding receive pulse shape filter implemented separately in analog hardware, so that portion of the optimal solution is assumed to be present.

A conceptual view of Equation (1) is that of whitening the colored noise and then matching to the composite channel. In this view Equation (1) can be split, at least conceptually for illustration, into separate whitening and matching filters as shown below $$H(\omega) = W(\omega)S(\omega) \quad (2)$$
$$W(\omega) = \frac{1}{\sqrt{I_{or}|P^*(\omega)G^*(\omega)|^2 + \Phi(\omega)}}.$$
$$S(\omega) = \frac{G^*(\omega)}{\sqrt{I_{or}|P^*(\omega)G^*(\omega)|^2 + \Phi(\omega)}}$$

Note that Equation (1) can be realized directly at either the symbol rate or the chip rate.

As will be described later herein, the present invention's use of selective received signal whitening can be applied at the chip rate, such as in a selective-whitening equalizer circuit. Alternatively, the present invention can be implemented for symbol-rate processing, such as in a selective-whitening Generalized RAKE (G-RAKE) receiver circuit.

In broad terms, the present invention comprises a method and apparatus that determines whether whitening is desired with respect to processing a received signal, and selectively enables or disables received signal whitening responsive to that determination. A metric oftentimes referred to as an "orthogonality factor" is known in the wireless communication arts, and it serves as a measure of how much downlink power from a given base station, or stations, is converted into intra-cell interference. Closed-form expressions for calculating the orthogonality factor of a received signal of interest are known, and an exemplary method for calculating the orthogonality factor is given as, $$\bar{\beta}_0 = a_1 - \frac{a_2}{\delta}, \quad (3)$$

where $\bar{\beta}_0$ equals the time-averaged orthogonality factor, $\alpha_1$ equals a constant value nominally set to 0.827, $\alpha_2$ equals a constant value nominally set to 0.755, and where, $$\delta = \frac{\left(\sum_{i=1}^{N} g_i\right)^2}{\sum_{i=1}^{N} g_i^2} \quad (4)$$

Here, $g_i$ represents the average power of the ith medium channel coefficient and is expressed as, $$g_i = E[|c_i|^2], \quad (5)$$

where $c_i$ equals the ith propagation channel coefficient, which also may be referred to as $h_i$ in this discussion.

The above expression for the orthogonality factor is valid at least for independent Rayleigh fading paths and one or more exemplary embodiments of the present invention put it to use in controlling the interference suppression operations of a wireless communication receiver.

In one or more embodiments of the present invention, received signal whitening is or is not applied based on calculating and evaluating an orthogonality factor. However, it should be understood that other metrics can be used for selective whitening decision-making, and that other calculations may be performed to obtain the same or like orthogonality factors for selective whitening determination. Thus, it should be understood that the present invention applies broadly to enabling and disabling one or more interference suppression processes in a wireless communication receiver responsive to evaluating whether such processes are desirable given current reception conditions, e.g., a computational assessment of the received signal and/or its noise and interference properties to determine whether such processing currently is desirable. Alternatively, or additionally, the selective application of interference suppression can be based on determining whether the receiver is in a soft handoff condition—i.e., in soft handover between two or more network transmitters. In an exemplary embodiment, interference suppression is disabled during soft handover.

Although interference suppression may not be desirable during soft handover, it generally is desirable during reception conditions wherein intra-cell interference, also referred to as same-cell interference, is a relatively significant component of received signal interference. This type of condition can be recognized at the receiver based on calculating the orthogonality factor and comparing it to a defined threshold. For example, the receiver can be configured to deem interference suppression desirable when the orthogonality factor is at or above the threshold, and to deem interference suppression undesirable when the orthogonality factor is below the threshold. The orthogonality factor will be low where the propagation channels between the remote transmitter and the receiver of interest are not dispersive, or where the channel is thermal noise limited. In this context, the term "undesirable" may simply connote a prevailing signal condition where interference suppression (received signal whitening) is deemed unnecessary, or of marginal benefit.

With the above in mind, FIG. 1 is at least a partial diagram of an exemplary wireless communications receiver 10 that may be included in a mobile station, for example. Receiver 10 includes a receiver circuit comprising an orthogonality factor calculation circuit 12 and one or more received signal processing circuits 14 responsive thereto. Receiver 10 may further comprise additional processing circuits 16, as needed (e.g., decoders, or other baseband processing circuits).

The orthogonality factor calculation circuit 12 is configured to calculate an orthogonality factor for a received signal, and the one or more received signal processing circuits 14 are configured selectively to whiten the received signal based on the orthogonality factor. Thus configured, receiver 10 supports a method wherein processing the received signal comprises calculating an orthogonality factor for the received signal, and selectively whitening the received signal based on the orthogonality factor. Selectively whitening the received signal based on the orthogonality factor comprises whitening the received signal if the orthogonality factor is above a defined orthogonality factor threshold, and not whitening the received signal if the orthogonality factor is below a defined orthogonality factor threshold.

Note that the power consumption of the received signal processing circuit(s) 14 may be varied as a function of whether received signal whitening is or is not being carried out. For example, where the received processing circuit(s) 14 are implemented as clocked circuits, which is common for digital logic circuits, the clock speed may be reduced to save power whenever whitening is not active. The ability to reduce clock speeds reflects the generally lowered computational overhead of received signal processing in the absence of whitening.

If circuitry associated with carrying out whitening (e.g., filters, selected computational units, etc.) are at least functionally segregated, then power savings may be affected by gating power to such circuits when not needed. For example, circuit elements that are active for whitening may be deactivated, or otherwise powered down, when whitening is inactive. Alternatively, the computational capacity freed when whitening is not active may be put to other use in received signal processing, such as to enhance some other aspect of received signal processing, or to supplement other ongoing calculation and processing tasks.

Figure 2:
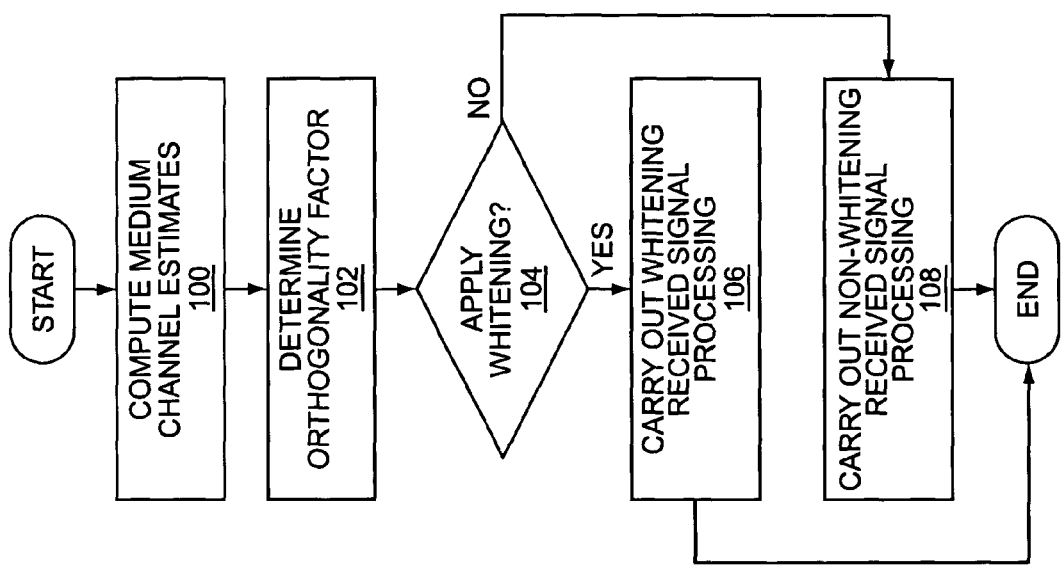
FIG. 2 is a diagram of exemplary processing logic for selectively enabled interference suppression.

Regardless of such optional enhancements, FIG. 2 illustrates exemplary processing logic for determining whether to enable or disable interference suppression based on dynamically evaluating the orthogonality factor associated with a received signal of interest. Processing begins with computation of the medium channel coefficients, which model the actual propagation channels (Step 100). With the medium channel coefficients thus computed, the orthogonality factor calculation circuit 12 calculates the orthogonality factor (Step 102). As noted earlier, the orthogonality factor calculation circuit 12 can maintain a time-averaged orthogonality factor that is updated on a recurring basis, such as every slot or frame of the received signal.

In any case, the orthogonality factor calculation circuit 12 evaluates the current value of the orthogonality factor to determine whether received signal processing should include interference suppression operations, e.g., whitening (Step 104). If so, interference suppression is enabled, and whitening received signal processing is carried out (Step 106). If not, non-whitening received signal processing is carried out (Step 108).

By way of example, the above selective whitening method may comprise generating whitening RAKE combining weights for RAKE combining the received signal if the orthogonality factor is above a defined orthogonality factor threshold, and generating non-whitening RAKE combining weights for RAKE combining the received signal if the orthogonality factor is below a defined orthogonality factor threshold. Complementing this embodiment, FIG. 3 illustrates processing circuit(s) 14 implemented as a Generalized RAKE (G-RAKE) receiver 20 that comprises RAKE despreader and RAKE combining circuits 22, and a combining weight generator 24.

In operation, combining weight generator 24 generates the combining weights for RAKE combining the received signal as non-whitening combining weights or as whitening combining weights in dependence on the orthogonality factor as calculated by the orthogonality factor calculation circuit 12. For example, the state of an orthogonality factor (OF) indicator signal provided to combining weight generator 24 may be used to control whether combining weight generation is or is not based on whitening the received signal.

More particularly, the combining weight generator 24 alters its combining weight generation such that it generates whitening combining weights that, when used to RAKE combine the various RAKE finger outputs, produce an interference-suppressed (whitened) RAKE combined signal. RAKE receivers incorporating such whitening combining weight generation are referred to herein as G-RAKE receivers.

With G-RAKE operation, in addition to placing one or more "fingers" on multipath components of the received signal, additional fingers are used to measure received interference and, thus, the combining weights incorporate statistical interference and noise properties, rather than just representing the complex conjugates of the channel coefficients as in the standard RAKE receiver. For further exemplary G-RAKE details, one may refer to U.S. application Ser. No. 09/344,899, which is incorporated by reference herein.

RAKE receiver 20 thus operates either as a standard RAKE receiver or as a G-RAKE receiver in dependence on the evaluation of whether or not interference suppression should be used, as indicated in this exemplary embodiment by the control signal output of the orthogonality factor calculation circuit 12. For an exemplary configuration of that circuit, G-RAKE operation is commanded when the orthogonality factor is high, i.e., when same-cell interference is high, and standard RAKE operation is commanded when the orthogonality factor is low, where thermal noise dominates or the channel is not dispersive. Here, "high" and "low" may denote relative levels determined by comparing the calculated orthogonality factor to one or more defined orthogonality factor thresholds.

In another embodiment, selective whitening comprises generating whitening equalizer filter coefficients for equalizing the received signal if the orthogonality factor is above a defined orthogonality factor threshold, and generating non-whitening equalizer filter coefficients for equalizing the received signal if the orthogonality factor is below a defined orthogonality factor threshold. Complementing this embodiment, FIG. 4 illustrates received signal processing circuit(s) 14 implemented as a (chip-spaced) equalizer 30, which comprises an equalizer circuit 32 providing received signal equalization based on equalizer filter coefficients generated by a filter coefficient generator 34.

In operation, filter coefficient generator 34 generates the equalizer filter coefficients for equalizing the received signal as non-whitening filter coefficients or as whitening filter coefficients in dependence on the orthogonality factor as calculated by the orthogonality factor calculation circuit 12. For example, the state of an orthogonality factor (OF) indicator signal provided to filter coefficient generator 34 may be used to control whether filter coefficient generation is or is not based on whitening the received signal.

In another embodiment, selective whitening comprises applying an over-whitening filter to the received signal in advance of RAKE combining the received signal if the orthogonality factor is above a defined orthogonality factor threshold, and not applying the over-whitening filter to the received signal if the orthogonality factor is below a defined orthogonality factor threshold. Complementing this embodiment, FIG. 5 illustrates the received signal processing circuit(s) 14 implemented as an over-whitening filter 40 and a RAKE receiver circuit 42.

In operation, the over-whitening filter 40 provides a over-whitened version of the received signal as the input to RAKE receiver circuit 42 or passes through (i.e., no filtering) the received signal to the RAKE receiver circuit 42 in dependence on the orthogonality factor as calculated by the orthogonality factor calculation circuit 12. For example, the over-whitening filter 40 may be turned "off" and "on" responsive to the state of an orthogonality factor (OF) indicator signal, or to one or more operating conditions (such as hand-off conditions). In other words, the over-whitening filter 40 can be configured to over-whiten the signal for a given OF signal value (or range), and not to over-whiten the signal for another given OF signal value (or range).

With respect to selective whitening, an exemplary frequency domain filter that can be implemented in one or more forms in accordance with the present invention is given as, $$H(\omega) = \frac{G^*(\omega)P^*(\omega)}{\alpha|G(\omega)P(\omega)|^2 + \Phi(\omega)}, \quad (6)$$

where $G^*(\omega)$ is the complex conjugate of the medium channel response, $P^*(\omega)$ is the complex conjugate of the transmit pulse shaping filter, $\alpha$ is proportional to the transmitting base station power (i.e., proportional to the energy of the transmitting base station), and $\Phi(\omega)$ is the power spectral density of everything not originating from the transmitting base station (i.e., it is a measure of the interference energy). Further, the term $|G^*(\omega)P^*(\omega)|^2$ accounts for same-cell interference.

In particular, the over-whitening filter 40 can be configured to implement received signal whitening, when enabled, as, $$\frac{1}{\alpha|G^*(\omega)P^*(\omega)|^2 + \Phi(\omega)}, \quad (7)$$

and the RAKE receiver circuit 42 can be configured to perform RAKE combining on the signal output by over-whitening filter circuit 40 using the complex conjugate of the channel response, $G^*(\omega)$. It will be appreciated by those skilled in the art that the particular implementation of signal whitening can be varied according to the particular circuit configuration and individual needs of each design.

Thus, irrespective of the particular details, the present invention makes receiver circuit interference suppression dependent on an evaluation of the characteristics of the received signal or, more broadly, based on assessment of current reception conditions. Receiver circuits configured in accordance with the present invention selectively apply interference suppression in circumstances where such application is deemed desirable, and forego such application in circumstances where such application is deemed unnecessary.

Figure 6:
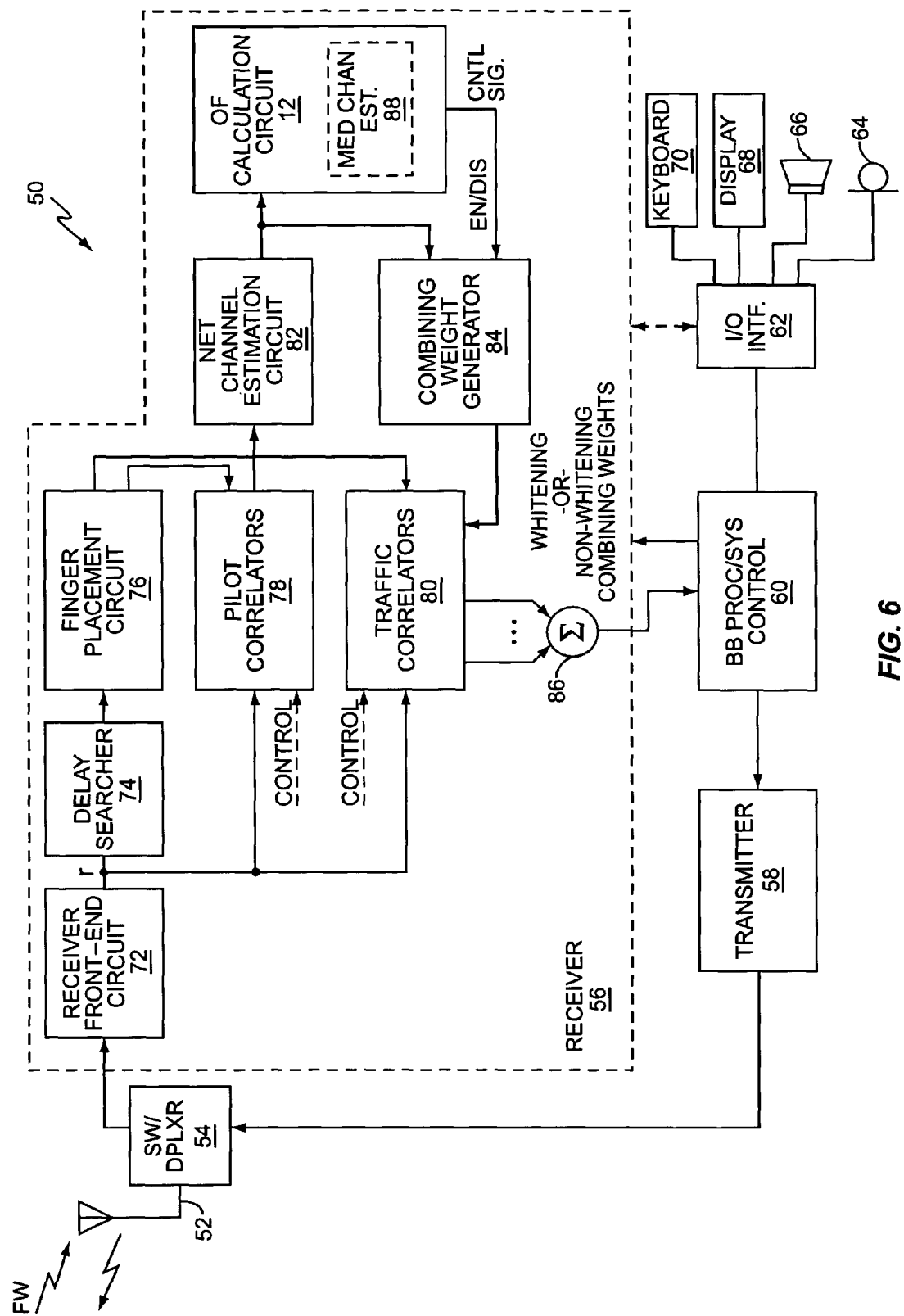
FIG. 6 is a diagram of a wireless communication device, e.g., a mobile station, incorporating selective received signal whitening according to one or more embodiments of the present invention.

In applying that inventive concept to a more detailed G-RAKE example, FIG. 6 illustrates an exemplary wireless communication device 50, which may be a mobile station such as a radio cellular telephone, for example. Device 50 comprises an antenna assembly 52, a switch and/or duplexer 54, a receiver 56, a transmitter 58, baseband signal processing and system control circuits 60, and a user interface (UI) comprising input/output interface circuits 62, a microphone 64, a speaker 66, a display 68, and a keypad 70. Note that these user-interface elements depend on the intended use of device 50 and it should be understood that not all of them may be implemented, and that other types of interface elements not depicted may be implemented without regard to the functionality of the present invention.

Receiver 56 comprises a receiver front-end circuit 72, a delay searcher 74, a finger placement circuit 76, a plurality of RAKE fingers including pilot signal correlators 78 and traffic signal correlators 80, a net channel estimation circuit 82, a combining weight generator 84, which may be configured like, or similar to, combining weight generator 24, a summing circuit 86, and an embodiment of the orthogonality factor calculation circuit 12, including a medium channel estimation circuit 88.

Front-end circuit 72 comprises any one or more of amplifiers, filters, mixers, local oscillators, and analog-to-digital-converter circuits, as needed to convert incoming antenna signals into a digitized, down-converted (e.g., baseband) received signal for processing according to the present invention. Thus, in one or more exemplary embodiments, the output of front-end circuit 72 is a received signal, r, that comprises a stream of digital values corresponding to the time-varying antenna-received signal. Those skilled in the art will appreciate that, depending upon the modulation format used in transmitting the received signal, the sampled received signal r may comprise in-phase (I) and quadrature (Q) digital streams. Regardless, exemplary operation of the various receiver elements in terms of processing the received signal r is explained below, with the aid of FIG. 7.

Figure 8:
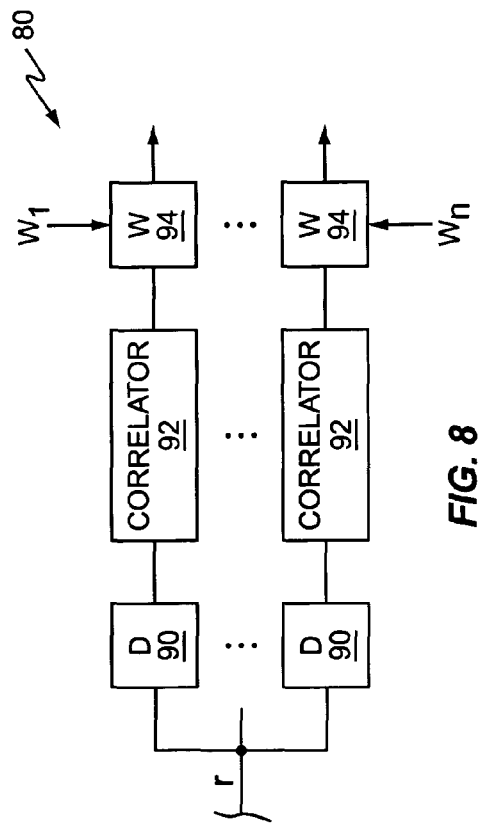
FIG. 8 is a diagram of exemplary RAKE finger details.

According to FIG. 7, exemplary receiver processing begins by determining path delays for the received signal via delay searcher 74 (Step 110). With a preliminary set of delays determined by the delay searcher 74, the delay information is then used by finger placement circuit 76 to place one or more of the RAKE fingers (i.e., correlators 78 and 80). FIG. 8 illustrates an exemplary arrangement of RAKE fingers (correlators) for traffic correlators 80 that make use of the whitening and non-whitening combining weights. In the illustration, traffic correlators 80 comprise delay elements 90, correlators 92, and weighting circuits 94.

Such placement may be done with the assumption that G-RAKE processing will be performed, or may be done according to RAKE or G-RAKE processing in accordance with orthogonality factor evaluation. The signal outputs of the pilot correlators 78 are used by the net channel estimation circuit 82 to generate net channel estimates.

The computation of net channel estimates includes, as noted, the effect of the transmit/receive pulse shaping filters, and can be computed in exemplary fashion for L delays according to, $$h = \frac{1}{10} \sum_{i=0}^{9} s^*(i) y_i, \quad (8)$$

where h is a vector of net channel coefficients corresponding to path delays and $y_i$ is a vector of despread pilot symbols for the ith symbol time. (Note that the L delays may correspond to one or more multipath delays of the received signal and one or more off-path delays used in G-RAKE noise/interference suppression.)

The L medium channel coefficients can be obtained from the net channel coefficients in exemplary fashion via $$h(\tau_0) = \sqrt{E_{CPICH}} \sum_{j=0}^{L-1} g_j R_p(\tau_0 - \tau_j) \quad (9)$$

$$h(\tau_1) = \sqrt{E_{CPICH}} \sum_{j=0}^{L-1} g_j R_p(\tau_1 - \tau_j)$$

$$\vdots$$

$$h(\tau_{L_i-1}) = \sqrt{E_{CPICH}} \sum_{j=0}^{L-1} g_j R_p(\tau_{L-1} - \tau_j),$$

where $\tau_i$ is the ith channel delay indicated by the delay searcher, $E_{CPICH}$ equals an energy measurement of a common pilot channel (CPICH), such as might be used in Wideband CDMA (WCDMA) wireless communication networks, $g_j$ equals the jth medium coefficient, and $R_p(\tau)$ represents the pulse shape correlation function given as $$\int_{-\infty}^{\infty} p(t+\tau) p^*(\tau) d\tau.$$

Equation (9) can be rewritten in vector-matrix notation and, absorbing the constant factor of $E_{CPICH}$ into the medium channel coefficients, expressed as, $$R_p \tilde{g} = h \quad (10)$$

Equation (10) can be solved by direct matrix inversion or by application of an iterative technique, such as Gauss-Seidel. The solution yields medium channel coefficients at the path delays, which then may be used to compute the orthogonality factor according to equations 1 and 2, which makes use of the medium channel coefficients for computation of a time-averaged orthogonality factor.

Of course, the present invention encompasses the use of other methods of solving for the medium channel coefficients, such as through the use of a grid-based approach or a Least Squares Estimation (LSE) process. The medium channel estimation circuit 88 of the orthogonality factor calculation circuit 12 as depicted in FIG. 6 can be configured according to any such methodology, such that it solves for the medium channel coefficients as needed during operation of the receiver 56 (Step 112).

With the medium channel coefficients thus available, the orthogonality factor calculation circuit 12 calculates a current orthogonality factor for the received signal, e.g., it updates a time-averaged orthogonality factor $\bar{\beta}_0$ based on the most recent medium channel coefficients (Step 114). Circuit 12 then evaluates that orthogonality factor to determine whether interference suppression currently is or is not desired. In carrying out this evaluation, an exemplary embodiment of circuit 12 compares $\bar{\beta}_0$ to a defined orthogonality threshold γ according to the following logic (Step 116):

$\bar{\beta}_0 < \gamma \rightarrow$ disable interference suppression, e.g., compute standard RAKE combining weights
$\bar{\beta}_0 > \gamma \rightarrow$ enable interference suppression, e.g., compute GRAKE combining weights.

The threshold γ can be determined empirically or theoretically, and stored as a fixed value in a memory within the device 50, or can be determined or adjusted dynamically based on measured receiver performance. Of course, the above threshold comparison should be understood as a non-limiting example. Thus, high and low thresholds could be used, hysteresis could be implemented, etc.

Regardless, the exemplary orthogonality factor calculation circuit 12 asserts or de-asserts a control signal or other indicator responsive to its evaluation of the calculated orthogonality factor (Steps 118 or 120, respectively). Such control signal manipulation can thus be used as an enabling/disabling control mechanism for the combining weight generator 84, such that it generates whitening combining weights estimates when $\bar{\beta}_0$ is at or above the defined threshold, and generates non-whitening combining weights when $\bar{\beta}_0$ is below the defined threshold.

As previously noted, the enabled or disabled state indication can be used to gate circuit power to processing circuits associated with signal whitening operations, such that power is saved when whitening is disabled. Similarly, the enable/disable indicator can be used to lower the operating frequency of a clocked processing circuit, such that lower power operating speeds are used when whitening operations are not being carried out.

In accordance with the above, then, the receiver 56 of device 50 selectively operates as a G-RAKE or RAKE receiver in dependence on the currently prevailing interference conditions. In this manner, the RAKE combined signal output by summing circuit 86 represents the selective application of interference suppression in accordance with evaluating received signal conditions.

Figure 9:
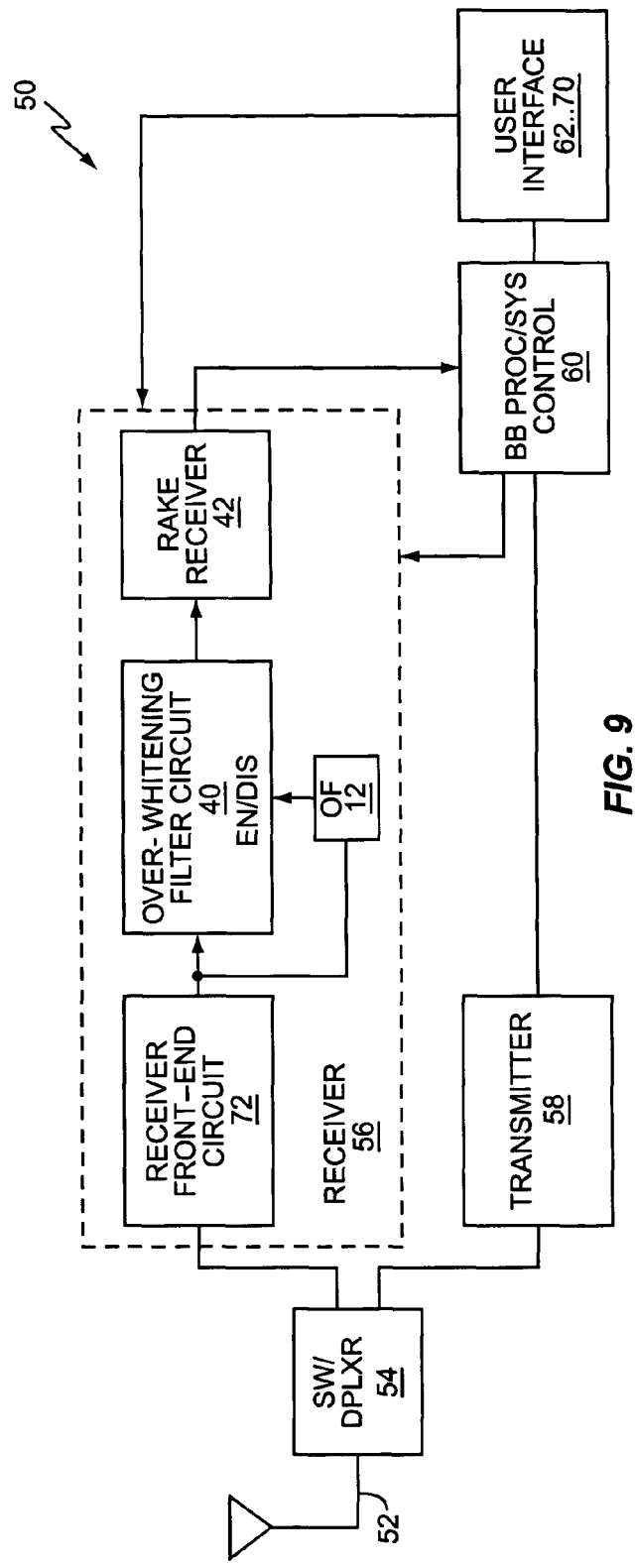
FIG. 9 is a diagram of a wireless communication device, e.g., a mobile station, incorporating selective received signal whitening according to one or more other embodiments of the present invention.

FIG. 9 illustrates a substantially similar process, but carried out in an embodiment of device 50 wherein an over-whitening filter/RAKE receiver combination is used for selective interference suppression rather than the selective RAKE/G-RAKE combining weight generator embodiment of FIG. 6. Operationally, the functions of over-whitening filter 40 and RAKE receiver 42 as depicted in the received signal processing chain of device 50 are the same as, or similar to, those discussed in the context of FIG. 5. Thus, receiver 56 can be operated as a standard RAKE receiver by disabling over-whitening filter circuit 40 when received signal whitening is deemed unnecessary, and can be operated as an over-whitening-plus-RAKE receiver by enabling over-whitening filter circuitry when received signal over-whitening is deemed desirable.

Moreover, the process of (1) placing searching for path delays, (2) computing medium channel coefficients, (3) computing the orthogonality factor, and (4) selectively enabling or disabling interference suppression, as explained in detail in the context of FIG. 6, can be applied in this context. Essentially, the only difference in the embodiment of FIG. 9 is that selective interference suppression is obtained not from varying the combining weight generation, but rather by selectively enabling or disabling the over-whitening filter 40 that is positioned in advance of RAKE receiver 42.

Thus, configuring device 50 to carry out selective interference suppression can be done according to any one of several exemplary embodiments. Further, it should be understood that the present invention is not limited to any particular circuit arrangement or any particular set of processing steps. For example, it should be noted that one or both of the orthogonality factor calculation circuit 12 and the received signal processing circuit(s) 14 can be implemented in hardware, or software, or any combination thereof. By way of non-limiting examples, then, these circuits may be hardware-based processing logic implemented in on or more Field Programmable Gate Arrays (FPGAs), Application Specific Integrated Circuits (ASICs), or in some other type of Complex Programmable Logic Device (CPLD). Alternatively, these circuits can be functionally implemented as computer program instructions for execution on one or more Digital Signal Processors (DSPs), microprocessors, microcontrollers, or other type of digital processing logic.

Irrespective of such details, the present invention broadly comprises carrying out received signal whitening on a selective basis as a function of determining whether such whitening currently is desired. Exemplary applications include, but are not limited to mobile stations, which may be cellular telephones, PDAs, pagers, or essentially any other type of "pervasive" computing device. As such the present invention is not limited by the foregoing discussion and accompany drawings, but rather is limited only by the following claims and their reasonable equivalents.

What is claimed is:

1. In a wireless communication receiver, a method of processing a received signal comprising:
    calculating an orthogonality factor for the received signal, the orthogonality factor indicating the effect of intra-cell interference on the received signal; and
    selectively whitening the received signal based on the orthogonality factor.

2. The method of claim 1, wherein selectively whitening the received signal based on the orthogonality factor comprises whitening the received signal if the orthogonality factor is above a defined orthogonality factor threshold, and not whitening the received signal if the orthogonality factor is below the defined orthogonality factor threshold.

3. The method of claim 1, wherein selectively whitening the received signal based on the orthogonality factor comprises generating whitening RAKE combining weights for RAKE combining the received signal if the orthogonality factor is above a defined orthogonality factor threshold, and generating non-whitening RAKE combining weights for RAKE combining the received signal if the orthogonality factor is below the defined orthogonality factor threshold.

4. The method of claim 1, wherein selectively whitening the received signal based on the orthogonality factor comprises generating whitening equalizer filter coefficients for equalizing the received signal if the orthogonality factor is above a defined orthogonality factor threshold, and generating non-whitening equalizer filter coefficients for equalizing the received signal if the orthogonality factor is below the defined orthogonality factor threshold.

5. The method of claim 1, wherein selectively whitening the received signal based on the orthogonality factor comprises applying an over-whitening filter to the received signal in advance of RAKE combining the received signal if the orthogonality factor is above a defined orthogonality factor threshold, and not applying the over-whitening filter to the received signal if the orthogonality factor is below the defined orthogonality factor threshold.

6. The method of claim 1, wherein calculating an orthogonality factor for the received signal comprises calculating a time-averaged orthogonality factor based on an average power of medium channel coefficients associated with the received signal.

7. The method of claim 1, wherein calculating an orthogonality factor for the received signal comprises computing medium channel coefficients associated with the received signal, and calculating the orthogonality factor from the medium channel coefficients.

8. A wireless communication receiver circuit comprising:
    an orthogonality factor calculation circuit configured to calculate an orthogonality factor for a received signal, the orthogonality factor indicating the effect of intra-cell interference on the received signal; and
    one or more received signal processing circuits configured selectively to whiten the received signal based on the orthogonality factor.

9. The wireless communication receiver circuit of claim 8, wherein the one or more received signal processing circuits are configured selectively to whiten the received signal based on the orthogonality factor by whitening the received signal if the orthogonality factor is above a defined orthogonality factor threshold, and not whitening the received signal if the orthogonality factor is below the defined orthogonality factor threshold.

10. The wireless communication receiver circuit of claim 8, wherein the one or more received signal processing circuits comprise a RAKE receiver configured to generate whitening RAKE combining weights for RAKE combining the received signal if the orthogonality factor is above a defined orthogonality factor threshold, and configured to generate non-whitening RAKE combining weights for RAKE combining the received signal if the orthogonality factor is below the defined orthogonality factor threshold.

11. The wireless communication receiver circuit of claim 8, wherein the one or more received signal processing circuits comprise a received signal equalizer configured to generate whitening equalizer filter coefficients for equalizing the received signal if the orthogonality factor is above a defined orthogonality factor threshold, and configured to generate non-whitening equalizer filter coefficients for equalizing the received signal if the orthogonality factor is below the defined orthogonality factor threshold.

12. The wireless communication receiver circuit of claim 8, wherein the one or more received signal processing circuits comprise a RAKE receiver circuit and an over-whitening filter positioned in advance of the RAKE receiver circuit, and wherein the over-whitening filter is configured to over-whiten the received signal if the orthogonality factor is above a defined orthogonality factor threshold, and not to over-whiten the received signal if the orthogonality factor is below the defined orthogonality factor threshold.

13. The wireless communication receiver circuit of claim 8, wherein the orthogonality factor calculation circuit is configured to calculate a time-averaged orthogonality factor based on an average power of medium channel coefficients associated with the received signal.

14. The wireless communication receiver circuit of claim 8, wherein the orthogonality factor calculation circuit is configured to calculate the orthogonality factor based on medium channel coefficients determined for the received signal.

15. The wireless communication receiver circuit of claim 8, wherein the one or more received signal processing circuits are configured to reduce a processing clock speed if the received signal is not being whitened.

16. The wireless communication receiver circuit of claim 8, wherein the one or more received signal processing circuits are configured to save power by disabling one or more circuit elements associated with whitening if the received signal is not being whitened.

17. A mobile station for use in a wireless communication network comprising:
    a wireless communication transceiver, including a transmitter and a receiver, for wirelessly communicating with the network;
    said receiver comprising:
        an orthogonality factor calculation circuit configured to calculate an orthogonality factor for a received signal, the orthogonality factor indicating the effect of intra-cell interference on the received signal; and one or more received signal processing circuits configured selectively to whiten the received signal based on the orthogonality factor.

18. The mobile station of claim 17, wherein the one or more received signal processing circuits are configured selectively to whitening the received signal based on the orthogonality factor by whitening the received signal if the orthogonality factor is above a defined orthogonality factor threshold, and not whitening the received signal if the orthogonality factor is below the defined orthogonality factor threshold.

19. The mobile station of claim 17, wherein the one or more received signal processing circuits comprise a RAKE receiver configured to generate whitening RAKE combining weights for RAKE combining the received signal if the orthogonality factor is above a defined orthogonality factor threshold, and configured to generate non-whitening RAKE combining weights for RAKE combining the received signal if the orthogonality factor is below the defined orthogonality factor threshold.

20. The mobile station of claim 17, wherein the one or more received signal processing circuits comprise a received signal equalizer configured to generate whitening equalizer filter coefficients for equalizing the received signal if the orthogonality factor is above a defined orthogonality factor threshold, and configured to generate non-whitening equalizer filter coefficients for equalizing the received signal if the orthogonality factor is below the defined orthogonality factor threshold.

21. The mobile station of claim 17, wherein the one or more received signal processing circuits comprise a RAKE receiver circuit and an over-whitening filter positioned in advance of the RAKE receiver circuit, and wherein the over-whitening filter is configured to over-whiten the received signal if the orthogonality factor is above a defined orthogonality factor threshold, and not to over-whiten the received signal if the orthogonality factor is below the defined orthogonality factor threshold.

22. The mobile station of claim 17, wherein the orthogonality factor calculation circuit is configured to calculate a time-averaged orthogonality factor based on an average power of medium channel coefficients associated with the received signal.

23. The mobile station of claim 17, wherein the orthogonality factor calculation circuit is configured to calculate the orthogonality factor based on medium channel coefficients determined for the received signal.

24. In a wireless communication receiver, a method of processing a received signal comprising:
    determining whether the receiver is in a soft handover condition; and
    selectively whitening the received signal based on said determination.

25. The method of claim 24, wherein selectively whitening the received signal based on said determination comprises one of selectively applying an over-whitening filter to the received signal in advance of RAKE processing the received signal, selectively generating whitening versus non-whitening filter coefficients for equalizing the received signal, and selectively generating whitening versus non-whitening RAKE combining weights for RAKE processing the received signal.

26. A non-transitory computer readable medium storing computer program instructions for processing a received signal, said computer program instructions comprising:
    program instructions to calculate an orthogonality factor for the received signal, the orthogonality factor indicating the effect of intra-cell interference on the received signal; and
    program instructions to selectively whiten the received signal based on the orthogonality factor.

27. A non-transitory computer readable medium storing computer program instructions for processing a received signal in a wireless communication receiver, said computer program instructions comprising:
    program instructions to determine whether the receiver is in a soft handover condition; and
    program instructions to selectively whiten the received signal based on said determination.

* * * * *